No. 802,750. PATENTED OCT. 24, 1905.
J. H. GRAY.
BEARING FOR SUBAQUEOUS AND OTHER SHAFTS.
APPLICATION FILED JUNE 1, 1904.
3 SHEETS—SHEET 1.
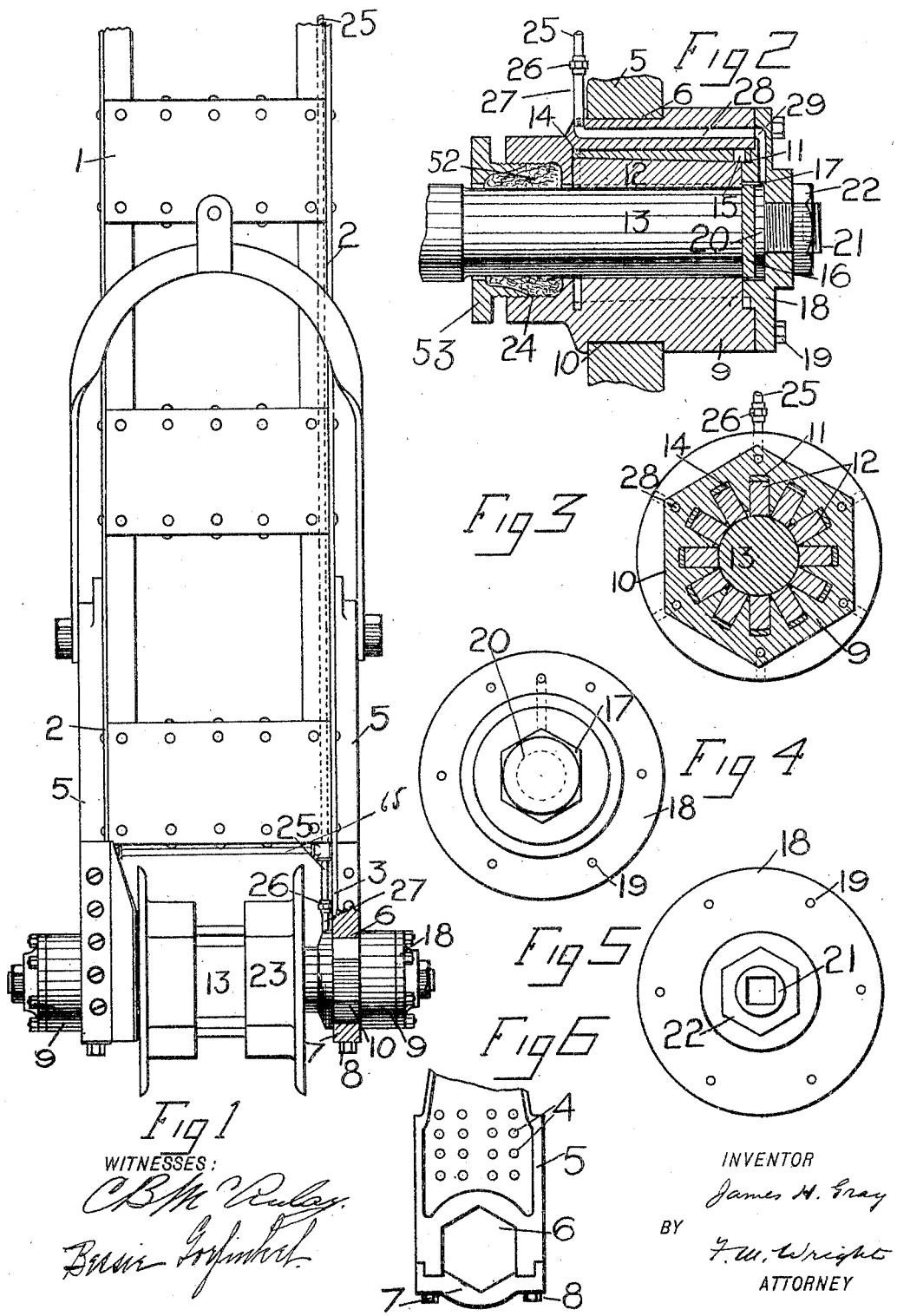
WITNESSES:
INVENTOR
James H. Gray
BY
F. M. Wright
ATTORNEY No. 802,750. PATENTED OCT. 24, 1905.
J. H. GRAY.
BEARING FOR SUBAQUEOUS AND OTHER SHAFTS.
APPLICATION FILED JUNE 1, 1904.
3 SHEETS—SHEET 2.
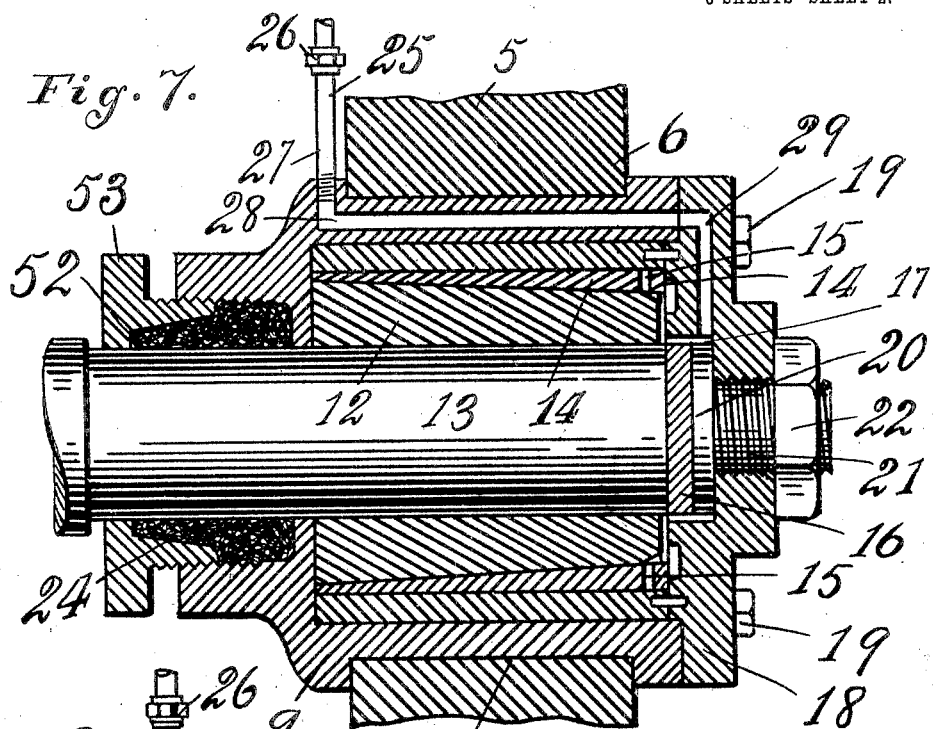
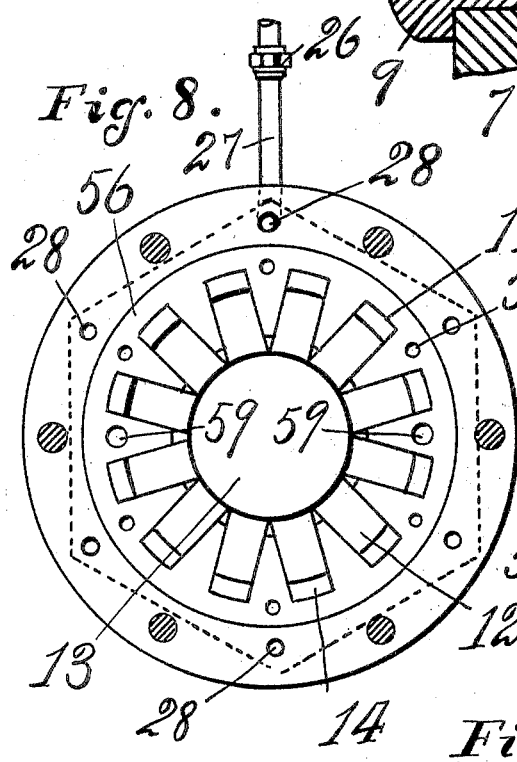
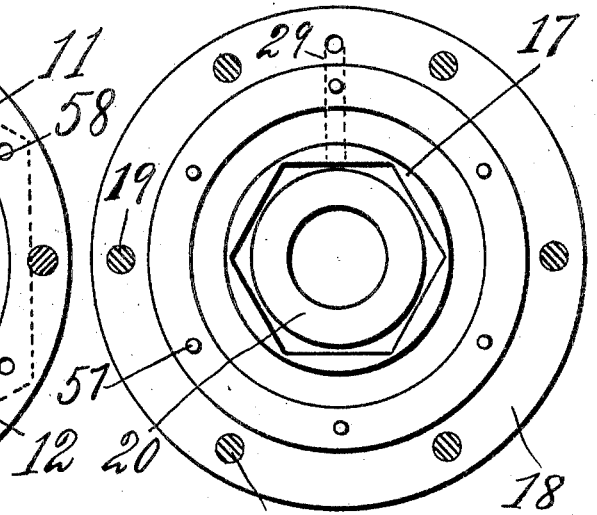
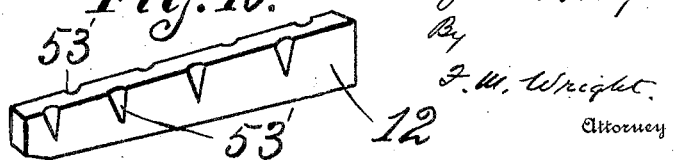

No. 802,750. PATENTED OCT. 24, 1905.
J. H. GRAY.
BEARING FOR SUBAQUEOUS AND OTHER SHAFTS.
APPLICATION FILED JUNE 1, 1904.
3 SHEETS—SHEET 3.
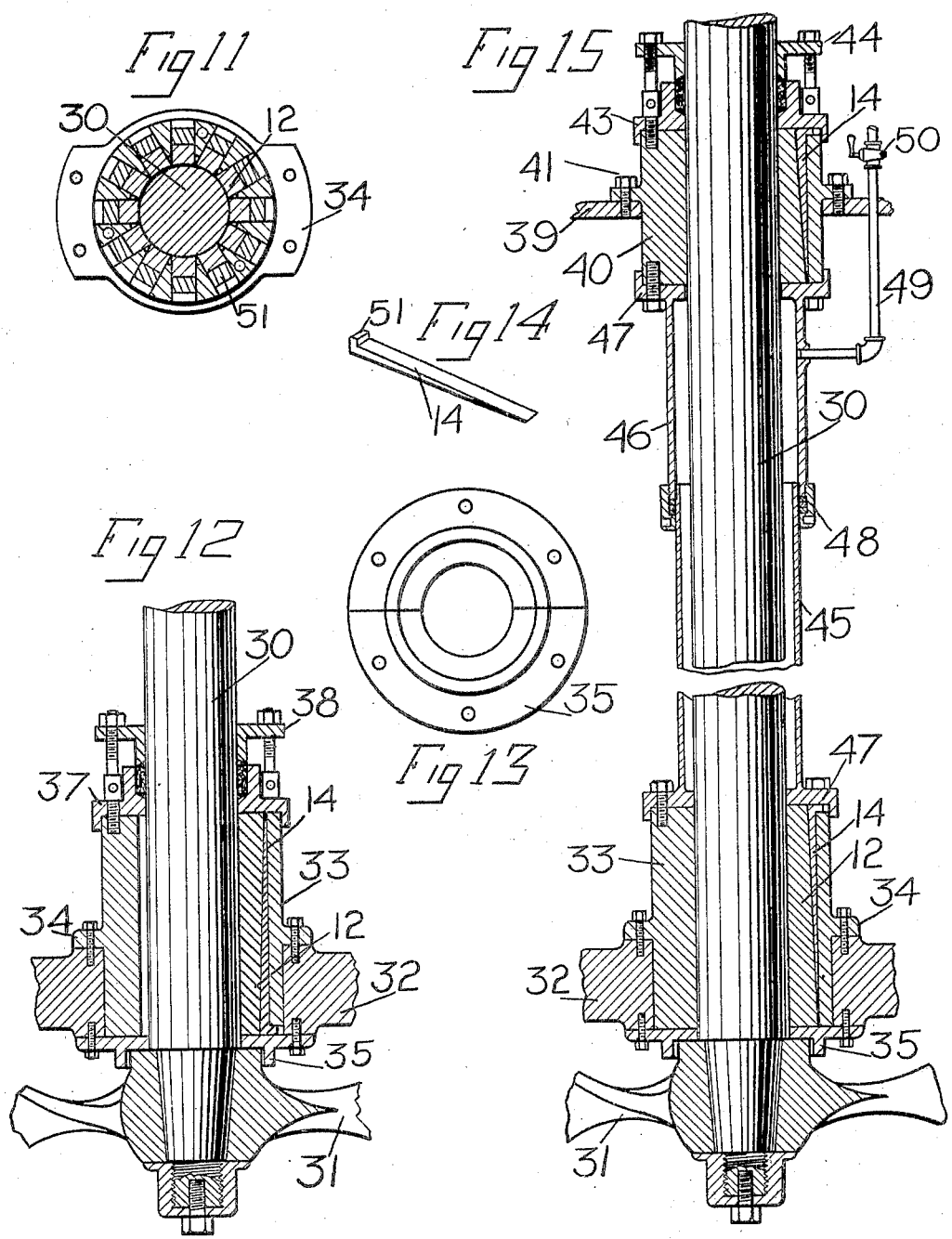
WITNESSES:
INVENTOR
James H. Gray
BY
Attorney

UNITED STATES PATENT OFFICE.

JAMES H. GRAY, OF SAN FRANCISCO, CALIFORNIA.

BEARING FOR SUBAQUEOUS AND OTHER SHAFTS.

No. 802,750.   Specification of Letters Patent.   Patented Oct. 24, 1905.

Application filed June 1, 1904. Serial No. 210,686.

*To all whom it may concern:*

Be it known that I, JAMES H. GRAY, a citizen of the United States, residing at San Francisco, in the county of San Francisco and State of California, have invented certain new and useful Improvements in Bearings for Subaqueous and other Shafts, of which the following is a specification.

My invention relates to improvements in bearings for shafts, and is especially applicable to shafting which is intended to be used under water, more particularly for the shaft of the lower tumblers of bucket-dredges, and which can also be used advantageously with marine propeller-shafts. I have therefore herein illustrated my invention as applied in these uses.

The object of my invention is to provide a bearing for a shaft whereby lubrication by oil may be dispensed with, in which it may be possible to take up the wear on the bearing as required with the greatest facility, to provide, furthermore, means for the lubrication of the bearing and the exclusion of grit, thus enabling the shaft to run for an indefinite period without stopping for repairs or renewal.

My invention therefore resides in the novel construction, combination, and arrangement of parts for the above ends hereinafter fully specified, and particularly pointed out in the claims.

In the accompanying drawings, Figure 1 is a front elevation of the lower portion of a bucket-ladder for a dredger which carries the lower tumbler, the support for the bearing on one side being broken away. Fig. 2 is a longitudinal section of the bearing. Fig. 3 is a cross-section thereof. Fig. 4 is a view of the inner side of the cap detached. Fig. 5 is a view of the outer side thereof. Fig. 6 is a detail view of one of the strengthening-plates detached. Fig. 7 is a view similar to Fig. 2 of a modified form of bearing. Fig. 8 is an end view of the same, the cap being detached. Fig. 9 is a view similar to Fig. 4 of said modification. Fig. 10 is a perspective view of one of the bearing-blocks detached. Fig. 11 is a transverse section of the bearing for a marine propeller. Fig. 12 is a longitudinal section of the same. Fig. 13 is an end view of the outer collar detached. Fig. 14 is a perspective view of one of the wedges. Fig. 15 is a view similar to Fig. 12 of a modified form of bearing.

Referring to the drawings, 1 represents the dredger-bucket ladder, the side plates 2 of which are extended, as shown, and onto said extensions 3 are riveted, as shown at 4, the strengthening-plates 5, having at their lower ends recesses 6, forming part of a hexagonal box to receive the bearing 9 of the tumbler-shaft. Said boxes are closed by plates 7, secured by bolts 8. Each bearing 9 has a portion 10 thereof formed on its outer surface into a hexagon to be received within the box of the strengthening-plate, the inner surface being formed with a circular series of square recesses 11. In these recesses are placed bearing-blocks 12 of lignum-vitæ wood or other durable material.

Behind the bearing-blocks 12 in the recesses are inserted wedges 14, and the blocks taper slightly outward, their inner surfaces, next the shaft, being bored out cylindrically to conform with the shaft. The wedges 14, on the other hand, taper inward to a corresponding degree. The object of providing these wedges is to render it possible to take up the wear in the bearing, for this can now be readily done by taking out any wedge and inserting a thin strip of metal or other suitable material in the recess either behind the wedge or between it and the block, calculating the thickness as being exactly sufficient to restore the block to its proper position relatively to the shaft when the wedge is replaced—that is, to take up the wear. These strips do not appear in the drawings, for they are not used at first, but only after wear on the bearing. These wedges are formed each with a socket 15 at the end or a head 51, (shown in Fig. 14,) so that they can be readily removed by means of a proper instrument. It will seen that the same result may be accomplished by having the bottoms of the recesses 11 inclined to the same degree as the taper of the wedges. This would allow the bearing-blocks to be of even width their entire length; but owing to the greater convenience in construction it is thought better to make the bottoms of the recesses parallel with the surface of the shaft.

As it is desirable to restrict the outer dimensions of the bearing-boxes as much as possible on account of the limited space, the bearing-blocks must in consequence be narrow, and on this account and also because the bearing-surface must be on the end grain of the wood and is therefore itself insufficiently resistant it must be well supported in all directions of pressure and strain. The construction as described achieves this result, as the wedges 14 and the sides of the recesses 11 support the bearing-blocks their entire length and the inner edges of the blocks at their bearing-surfaces come into contact with each other, making the bearing-surface continuous in its entire circumference and length. The points of the metal between the recesses 11 are cut back slightly, so that when the bearing-blocks become worn the shaft will not come in contact with the metal. This also leaves interstices through which water can pass, as hereinafter mentioned. The shaft working against the faces of these blocks abuts against a block 16 of lignum-vitæ wood or other suitable material received in a recess 17 in a cap 18, which is secured to the bearing by bolts 19. The hexagonal form of this recess 17 prevents the block 16 turning. This block 16 can be adjusted longitudinally to take up the end thrust of the shaft by means of a plate 20 behind said block, said plate having a stem 21 screwed through a hole in the center of the cap 18 for adjustment and being held in position by means of a set-nut 22. By loosening the set-nut and screwing the stem of the plate in or out and again tightening the set-nut the plate can be readily adjusted and held in position.

23 represents the tumblers carried upon the shaft 13, around which the bucket-chains travel, the construction of which, however, forms no part of my present invention.

The bearing 9 has in the end next the tumbler a cavity 24, suitably packed, as shown at 52, and a gland 53 to prevent grit entering the bearing. I do not, however, wholly rely upon the packing for this purpose, but provide means for positively excluding the grit therefrom. These means consist of a water-pipe 25, extending within the bucket-ladder to the top thereof, so as to obtain a considerable head or pressure at the bottom of the pipe. This pipe passes down within the plate 5 and is provided at the lower end with a union 26, by which it is connected with a short pipe 27, leading into a conduit 28 within the material of the bearing, said conduit bending in a direction parallel with the shaft and leading to a conduit 29, formed in the cap 18, which latter conduit extends inwardly or in a radial direction and leads into a space around the block 16 for receiving the end thrust, thence communicating with the interstices between the bearing-blocks 12. By this means water under considerable pressure is introduced into the bearing. The bearing-blocks 12 are provided at their adjoining edges with recesses 53', forming conduits leading from the interstices between the blocks onto the shaft, thus thoroughly lubricating the shaft. The water is then forced out past the packing in the recess 24 toward the tumbler, and as there is a strong flow of water under the pressure applied it can readily be seen that no grit can enter the bearing.

The wear on the bearing will be uneven on account of the greater weight on one part than on another. It is therefore desirable to change the position of the bearing at suitable intervals, turning it around to bring a fresh part of the bearing into a position exposed to the greatest wear. I therefore provide six such conduits 28, so that in any one of the six positions in which the bearing can be placed some one of the conduits will aline with the pipe 25 and conduct the water to the bearing for the purpose described, the unused conduits being plugged. The pipe 25 has a branch 65 leading to the opposite side of the ladder, by which the water is conducted in like manner to the other bearing.

In Figs. 7, 8, and 9 is illustrated a modified form of bearing. In this modification a removable cylindrical bushing 56 is provided. This bushing is recessed, as shown at 11, in like manner as was the bearing in the former modification and is provided with bearing-blocks 12, similar to those already described. The only differences are those which relate to the removability of the bushing. Thus to prevent the bushing rotating with the shaft the cap 18 has pins 57, which enter sockets 58 in the end of the bushing. Also to withdraw the bushing when desired screw-holes 59 are formed in the end, by which the bushing may be drawn out of the casing 9. This form enables the bushing only to be made of a non-corrosive metal, which metal is desirable, but expensive, while the outer portion of the bearing can be of a less expensive material.

The same improved adjustable bearing may be applied to marine propeller-shafts, and in Figs. 11 to 15 I have shown it so applied. In these figures, 30 represents the propeller-shaft, carrying on its end the propellers 31. 32 is the stern-post, in which is secured a bearing 33, similar in the interior to that illustrated in Figs. 2 and 3, but now having flanges 34, by means of which it is bolted to the stern-post. On the outer end of said bearing is secured a collar 35 around the propeller-shaft and bolted to the outer side of the stern-post for retaining the blocks 12 and wedges 14. This collar may be made in two halves, as shown in Fig. 13, to facilitate the wedges being removed without removing the propeller, and this construction is especially advantageous if the wedges taper inward, as shown in Fig. 12, so that they can be withdrawn outward for inserting the strips to take up the wear instead of inward, which in some cases may be desirable on account of the narrowness of the space for withdrawing the wedges inward; but where there is sufficient room at the stern of the vessel the wedges may be withdrawn inwardly, as shown in Fig. 15.

In some cases a special inner bulkhead is provided. Then the construction shown in Fig. 15 is desirable. In this figure, 39 represents the inside bulkhead, and 40 is an inner shaft-bearing secured to the bulkhead by bolts 41 and having a similar construction to the outer shaft-bearing. 43 is the flanged collar for retaining the blocks and wedges, and 44 the packing-gland. 45 46 represent two sections of a tubular casing around the shaft and having flanged heads 47 secured to the bearings. The section 45 passes within the section 46, and the joint between them is made tight by a packing-ring 48. The object of this construction is so that by unbolting the flange 47 and loosening the packing-ring 48 the casing 45 can be slipped back into the casing 46, thus making room for the removal of the wedges in the bearing 12 for adjustment. The water and sediment can be drawn off from this tubular casing by means of a pipe 49 and cock 50. In Fig. 14 is shown a modified form of wedge 14, having a head 51 for withdrawing it from the bearing for the purpose of inserting a strip to take up the wear.

In propeller-shaft bearings for vessels the water entering the outer ends of the bearings is generally sufficient to keep them lubricated; but if thought desirable a pipe with water under pressure may be applied to the inner end of the bearings to operate similarly to that shown in the dredger-bearing.

I claim—

1. In combination with a shaft, a bearing therefor comprising a cylinder having a circular series of longitudinal recesses, solid wooden bearing-blocks in said recesses having inclined outer sides, and wedges in said recesses behind said blocks, said wedges extending behind said blocks the whole length of the same, and being removable in the direction of their thick ends, substantially as described.

2. In combination with a shaft, a bearing therefor comprising a cylinder having a circular series of longitudinal recesses, solid wooden bearing-blocks in said recesses having inclined outer sides, and removable wedges in said recesses behind said blocks, said wedges extending behind said blocks the whole length of the same, and said wedges being provided at their thick ends with means whereby they may be engaged with a suitable instrument to extract the same from the recesses, substantially as described.

3. In combination with a shaft, a bearing therefor comprising a cylinder having a circular series of longitudinal recesses, solid wooden bearing-blocks in said recesses, removable wedges in said recesses behind said blocks, and a removable cap abutting against the ends of the wedges, and holding the inner ends of the wedges against the ends of the recesses, substantially as described.

4. In combination with a shaft, a bearing therefor comprising a cylinder having a circular series of longitudinal recesses having inner curved faces adjacent to each other forming a bearing for the shaft, bearing-blocks in said recesses, and means for forcing water through the interstices between the blocks, substantially as described.

5. In combination with a shaft, a bearing therefor comprising a cylinder having a circular series of longitudinal recesses having inner curved faces adjacent to each other forming a bearing for the shaft, bearing-blocks in said recesses, a cap closing the bearing and having a channel in communication with the interstices between the blocks, and means for supplying a stream of pressure-water to said channel, substantially as described.

6. In combination with a shaft, a bearing therefor comprising a cylinder having a circular series of longitudinal recesses, bearing-blocks in said recesses with notches or recesses 53 forming conduits therebetween, and means for supplying water to the spaces between the bearing-blocks, whereby the same can flow through said notches or recesses around the shaft, substantially as described.

7. In combination with a shaft, a bearing therefor comprising a cylinder having a circular series of longitudinal conduits therethrough, a cap over the end of the shaft having a channel in communication with one of said conduits, said channel being also in communication with the inside of the bearing around the shaft, and a pipe for supplying water to one of said longitudinal conduits according to the position of the bearing, substantially as described.

8. In combination with a shaft, a bearing therefor, a bushing in the bearing having longitudinal bearing-blocks around the shaft, a cap closing the end of the bearing and centrally recessed, a thrust-block in said recess against said shaft, a plate behind said block having a stem passing centrally through said cap, and means for adjusting the longitudinal position of said plate, substantially as described.

In witness whereof I have hereunto set my hand in the presence of two subscribing witnesses.

JAMES H. GRAY.

Witnesses:
 FRANCIS M. WRIGHT,
 BESSIE GORFINKEL.